June 26, 1951 — C. B. TONER, JR — 2,558,397
FISHING LURE
Filed Oct. 6, 1947
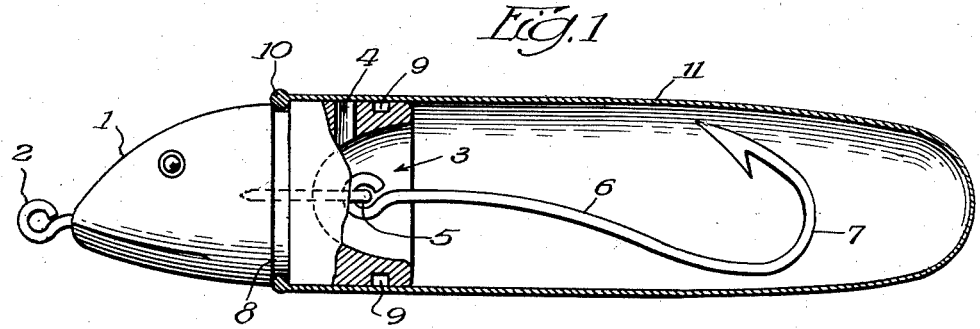
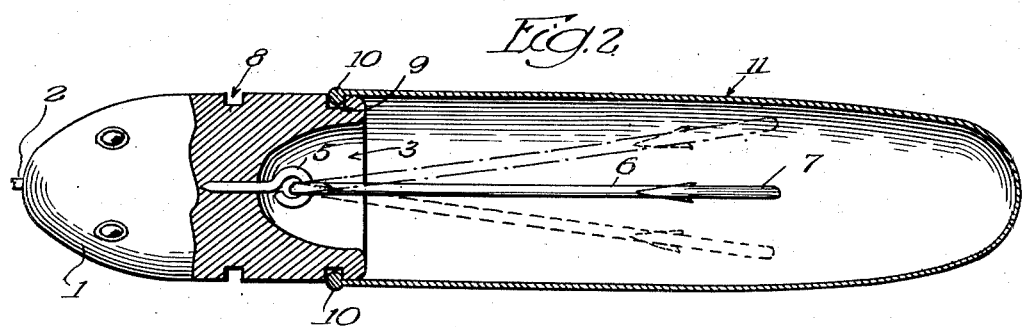
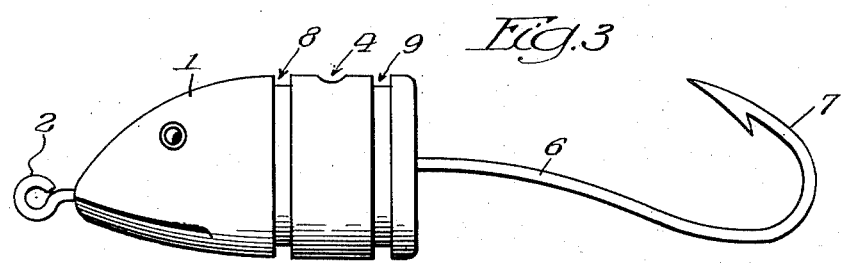
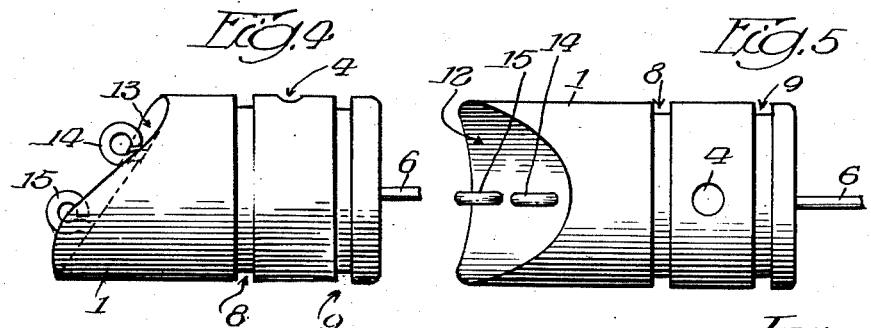
Inventor:
Clarence B. Toner
By Spencer, Marzall, Johnston & Cook
attys Patented June 26, 1951

2,558,397

UNITED STATES PATENT OFFICE 2,558,397

FISHING LURE

Clarence B. Toner, Jr., Chicago, Ill.

Application October 6, 1947, Serial No. 778,149

6 Claims. (Cl. 43—42.1)

This invention relates to a fishing lure or artificial bait for fishing, and is adapted to be used either in casting or for trolling.

The primary object of the present invention is to provide a new and improved fishing lure or artificial bait which simulates a live fish in appearance and has the characteristics of bobbing and wriggling through the water similar to a live fish, the lure being adapted to float upon the surface, or near the surface, or to sink below the surface a predetermined distance, depending upon the kind of fishing to be done.

A further object of the invention is to provide a natural looking artificial bait or lure so constructed and arranged that the lure will not only simulate in appearance a live fish, but can be manually manipulated so as to effect floating bait or sinking bait as desired.

A still further object of the invention resides in the provision of an artificial bait or fishing lure which has the hook encased in a light flexible thin rubber casing forming a sack, there being a compartment in a part of the lure adjacent the head thereof, and an opening passing through a part of the lure and communicating with the head, so that the casing or sack may be arranged in a predetermined position to cover the opening whereby the lure will float, the sack when arranged in a different position to uncover the opening will permit water to flow into the sack and cause the lure to sink a predetermined distance.

Numerous other objects and advantages will be apparent throughout the progress of the specification which follows.

The accompanying drawing illustrates a certain selected embodiment of the invention, and the views therein are as follows:

Fig. 1 is a detail elevational view of the improved artificial bait or fishing lure, parts being broken away for the sake of clearness;

Fig. 2 is a top plan view of the improved body, parts being broken away for the sake of clearness;

Fig. 3 is a detail elevational view of the lure with the encasing sack omitted;

Fig. 4 is a detail elevational view of a modified form of body, and employing a different type of head, the encasing sack being omitted; and Fig. 5 is a detail top plan view of the artificial bait or fishing lure shown in Fig. 4.

The particular body herein disclosed for the purpose of illustrating the invention comprises a head 1, the forward part of which may be shaped and configurated to simulate the head of a live fish. A fishline attaching member 2 is adapted to be secured to the forward end of the head 1, and this member preferably terminated in an eye or loop to permit the line to be attached easily thereto. A hollow compartment or chamber 3 is provided at the rear end of the head 1 and an elongated passageway 4, having communication with the compartment or chamber 3, is provided through a part of the head, particularly through the top thereof. More than one passageway 4 may be provided if desired. A screw eye 5 is screwed forwardly into the head and has its eye extending rearwardly, as clearly shown in Figs. 1 and 2, so that a fish hook 6 may be securely pivotally to the screw eye 5. It is preferable that the hook portion 7 of the hook 6 extend upwardly, as clearly shown in Figs. 1 to 3, and that the attaching eye of the hook engage the screw eye 5 in a position so that the hook may wiggle or riggle sideways as indicated in dotted lines in Fig. 2, whereby the lure when drawn through the water will wiggle from side to side to simulate a swimming live fish. The hook 6 in reality is mounted on a vertical pivot as the part of the eye 5 which engages the eye in the fish hook will constitute a vertical pivot for the hook and thus permit the hook to swing from side to side, as shown in Fig. 2.

The head 1 is adapted to be provided with spaced annular grooves 8 and 9 completely thereabouts, as clearly shown in the drawing. These annular grooves 8 and 9 are adapted to receive selectively an annular bead-like formation 10 formed on the exterior end of an encasing rubber sack 11. The rubber sack is adapted to encase the hook 6 so as to conceal the hook and make the fishing lure relatively weedless. The rubber sack 11 is adapted to have the annular bead-like formation 10 received in either of the annular grooves 8 or 9. Fig. 1 shows the sack 11 secured in position by the bead 10 engaging the forward annular groove 8. In this position (Fig. 1) the rubber sack 11 will cover the hole or holes 4; therefore, the part of the lure rearwardly of the rear end of the head 1 will contain air, and water will be prevented from entering into the hole or holes 4. The lure, therefore, is adapted to float and is advantageous for use for such type of fish that strike at the surface. The rubber sack 11 may be shifted rearwardly so that the bead-like formation 10 will engage the rearwardly positioned annular groove 9, as shown in Fig. 2. In this latter position (Fig. 2) the sack will leave the passage or passageways 4 uncovered and thereby permit water to enter into the sack rearward of the head and thereby cause the lure to become weighted. The thin flexible rubber, or rubber-like casing or sack 11 is thin enough to permit the hook portion 7 of the hook 6 to pierce the sack when a fish strikes the lure. Therefore, the fish will become impaled on the hook as easily as if the hook were bare, as the thin casing offers no resistance against the hook piercing the sack. The weighted lure is advantageous for fishing for such fish that strike below the surface. The artificial bait, therefore, is universal in that it may be used for surface fishing or for deep fishing, depending upon the position of the sack with respect to the head.

The line attaching member 2, which preferably is in the form of a screw eye, is so positioned that when the lure is pulled, the lure will have a vertical bobbing action in the water to further simulate the movement of a live fish. The head may be constructed and configured in a predetermined manner so as to effect greater bobbing action of the lure through the water. It has been found that by forming a curved cutout 12 extending from top to bottom, Fig. 5, and inclining laterally as indicated at 13, Fig. 4, greater bobbing action may be had. Further bobbing action may be had by arranging spaced upper and lower screw eyes 14 and 15 so that when the line is attached to a screw eye 14, one particular type of bobbing action will be had, but when the line is secured to the lower screw eye 15, a different type of bobbing action may be had.

The invention, therefore, comprises a relatively inexpensive fishing lure which is adapted to be used for both surface fishing and deeper fishing. The manner in which the hook is connected to the head causes the lure to effect a side-to-side or wiggling movement to simulate the movement of a swimming fish. Also, by the manner of positioning and locating the eye or loop to which the line is attached, certain bobbing actions may be had as the lure is drawn through the water. The rubber or rubber-like encasing sack 11 is somewhat in the form of a rubber finger stall, and when applied over the hook not only conceals the hook but makes the hook weedless, and, therefore, may be used in weeds or through lily pods without causing the hook to become grounded or otherwise snagged. It is preferable and desirable that the sack 11 be made of thin rubber or rubber-like material and that it have a considerable amount of stretch, particularly at the reenforced bead 10, so that it will be held securely in an annular groove 8 or 9.

Gang hooks may be substituted for the single hook herein shown, but it is desirable that the eye of the hook be in a relatively vertical plane and operating on a horizontal pivot so as to permit horizontal movement of the hook with respect to its attaching eye 5 and thereby obtain the wiggle of the lure as it is drawn through the water.

The invention is simple in construction and may be economically manufactured. The head 1 may be painted or colored as desired, and any type, shape or kind of sack may be used. For instance, the sack may terminate in spaced legs to simulate a frog. Various sacks may be interchanged and, therefore, the fisherman is provided with several kinds of bait by the application of different sacks 11. The sacks 11 may be colored or striped to simulate certain kinds of live fish which are conventionally used as lure or live bait.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed is follows:

1. A fishing lure comprising a head having an interior chamber formed therein and a passage through the head in communication with the chamber, a hook secured pivotally to the head at the rear end thereof, said head having an annular groove formed about the head on each side of the passage, and a rubber sack engageable selectively with said grooves and enveloping said hook.

2. A fishing lure comprising a head having an interior chamber formed therein and a passage through the head in communication with the chamber, a hook secured pivotally to the head at the rear end thereof, said head having an annular groove formed about the head on each side of the passage, a flexible stretchable sack eveloping said hook, and a bead on the sack and engageable with one of said grooves to secure the sack to the head.

3. A fishing lure comprising a head having an interior chamber formed therein and a passage through the head in communication with the chamber, a hook secured to the head, said head having an annular groove formed about the head on each side of the passage, a rubber sack engageable selectively with said grooves and enveloping said hook, said rubber sack having a closed end and an open end to envelope said hook, and a bead integral with the sack surrounding the open end, said bead adapted to be received in one of said grooves, said sack when engageable with one groove covering the passage to seal the passage whereby air in the sack will permit the lure to float, the sack when in another groove baring the passage whereby water may enter the passage and fill the sack to cause the lure to sink.

4. A fishing lure comprising a head having an interior chamber formed therein and a passage through the head in communication with the chamber, a hook secured pivotally to the head at the rear end thereof, said head having an annular groove formed about the head on each side of the passage, a rubber sack engageable selectively with said grooves and enveloping said hook, said rubber sack having a closed end and an open end to envelope said hook, and a bead integral with the sack surrounding the open end, said bead adapted to be received in one of said grooves, said sack when engageable with one groove covering the passage to seal the passage whereby air in the sack will permit the lure to float, the sack when in another groove baring the passage whereby water may enter the passage and enter the sack to cause the lure to sink, said hook being secured pivotally to the head on a horizontal pivot whereby the lure will wiggle from side to side as it is being drawn through the water, said head having its forward end shaped in a predetermined manner and carrying means to attach a line to the front of the head whereby the lure will be caused to bob up and down when the lure is drawn through the water.

5. A fishing lure comprising a head having a leading and a trailing end, said head having a passage providing an outlet opening at the trailing end of the head and an inlet opening in the head forwardly of said trailing end, a hook secured to and projecting from said head at said trailing end, a rubber sack, said head being formed with a pair of circumferential grooves spaced apart therein and disposed respectively between said inlet opening and each end of said head, said grooves affording means to secure the sack on said head in position enclosing the outlet end of the passage and said hook in said sack, and selectively in position covering and uncovering said inlet opening of the passage.

6. A fishing lure comprising a head having a leading and a trailing end, said head having a passage providing an outlet opening at the trailing end of the head and an inlet opening disposed in the sides of the head forwardly of said trailing end, a hook secured to and projecting from said head at said trailing end, said head being formed with circumferentially disposed peripheral grooves, including a groove disposed between the inlet opening and each of the ends of the head, and a rubber sack having a neck formed with a circumferential bead and adapted to be stretched and contracted upon said head with said bead positioned in either of said grooves whereby to secure the sack on the head in position enclosing the outlet end of the passage and said hook in said sack, and selectively in said grooves in position covering and uncovering said inlet opening of the passage.

CLARENCE B. TONER, Jr.

REFERENCES CITED

The following references are of record in the file of this patent:

UNITED STATES PATENTS

| Number | Name | Date |
| --- | --- | --- |
| 994,927 | Jefferson | June 13, 1911 |
| 2,016,960 | Dillon | Oct. 8, 1935 |
| 2,027,069 | Sorenson | Jan. 7, 1936 |
| 2,167,334 | Hayes | July 25, 1939 |
| 2,183,816 | Lovelace | Dec. 19, 1939 |
| 2,261,068 | Mackovich | Oct. 28, 1941 |